United States Patent [19]

Noguchi

[11] 3,945,872
[45] Mar. 23, 1976

[54] MAKING PLASTIC FILM WITH PROFILES AND OPENING MEANS FOR BAGS

[76] Inventor: Takashi Noguchi, Tokyo, Japan

[22] Filed: Dec. 26, 1973

[21] Appl. No.: 428,433

Related U.S. Application Data

[63] Continuation-in-part of Ser. No. 178,086, Sept. 7, 1971, Pat. No. 3,787,269.

[52] U.S. Cl. .............. 156/244; 156/498; 156/500
[51] Int. Cl.² ........................................ B32B 31/30
[58] Field of Search ....... 156/66, 91, 244, 497, 498, 156/500; 150/3; 264/176 R

[56] References Cited
UNITED STATES PATENTS

| | | | |
|---|---|---|---|
| 2,415,644 | 2/1947 | Leonhard et al. | 156/497 |
| 3,462,332 | 8/1969 | Goto | 156/244 |
| 3,780,152 | 12/1973 | Kriesner | 156/244 |

*Primary Examiner*—Caleb Weston
*Attorney, Agent, or Firm*—Hill, Gross, Simpson, Van Santen, Steadman, Chiara & Simpson

[57] ABSTRACT

A method and mechanism for continuously making a plastic film with shaped profiles on the surface including extruding a continuous length of interlocking profiles from a die shaped with a precise shape for interlockingly engaging with another profile and directing a flow of coolant on the profile from a stationary coolant means and adjusting the direction of flow of coolant relative to the direction of movement of the profile or controlling the pressure and temperature of the flow of coolant to control the cooling rate and the shape of the profile.

8 Claims, 7 Drawing Figures

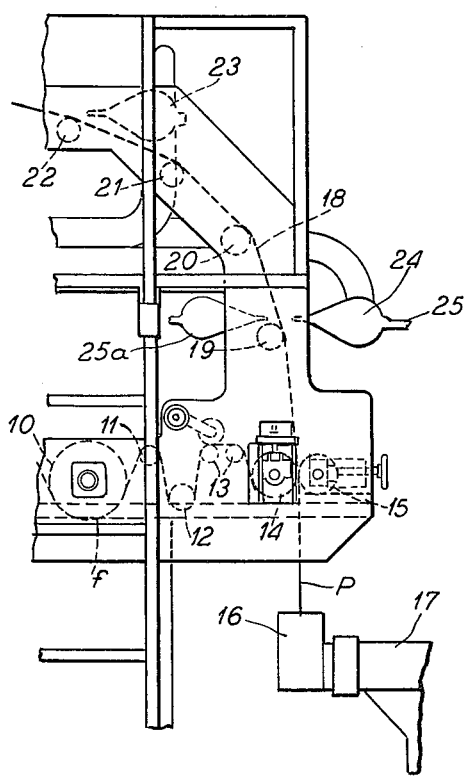

MAKING PLASTIC FILM WITH PROFILES AND OPENING MEANS FOR BAGS

This application is a continuation-in-part of my co-pending application, U.S. Ser. No. 178,086, filed Sept. 7, 1971 U.S. Pat. No. 3,787,269.

BACKGROUND OF THE INVENTION

The invention relates to improvements in plastic extrusion equipment and methods for forming film with shaped profiles on the surface where such film is eventually used in making reclosable bags or similar products.

More particularly, the invention relates to improvements in forming the profiles such that the shape can be more completely controlled at relatively high extrusion speeds so that a precise shape can be maintained to accurately and strongly interlock with another mating profile. One type of film having profiles on the surface is formed by supplying a continuous sheet of film and simultaneously extruding a profile which is laid on the film while hot so that it integrally attaches itself to the film to form a completed profile sheet. Mechanisms and processes for forming such sheets are shown in the copending applications of Takashi Noguschi, U.S. Ser. No. 178,086, filed Sept. 7, 1971 and U.S. Ser. No. 178,087, filed Sept. 7, 1971. It will be understood that the features of the invention find advantage in forming profiles by other methods and other mechanisms, but the invention will be primarily described in connection with an environment such as that shown in the above referred to copending applications, the disclosures of which are embodied herein by reference. The features described herein may be employed, for example, in an extrusion arrangement wherein the profile is not formed separately and applied to a film white hot, but wherein the profile and film are extruded simultaneously out of a single die opening. It is also contemplated that the features of the invention may be employed in an arrangement wherein the film and profile are extruded separately, but substantially immediately joined to each other.

In the formation of profile sheets with the improvement of extrusion techniques and profile and film designs, it has become possible to form a very thin film of only a few mils of thickness and to make the profile very small and yet obtain interlocking profiles which will join to each other with a strength that approaches or surpasses the strength of the film. To obtain an efficient highly effective interlocking profile depends upon the accuracy thereof, and this accuracy is hard to maintain at high extrusion speeds. It has been discovered that an important factor in maintaining the shape of the profile is in controlling the cooling thereof.

It is accordingly an object of the present invention to provide an improved mechanism and method for the production of profiled film obtaining more accurate and better control of profile shape and/or higher extrusion rates.

A still further object of the invention is to provide an improved method and mechanism for accurately controlling the shape of extruded plastic profiles during continuous extrusion.

Other objects, advantages and features, as well as equivalent mechanisms and methods which are intended to be covered herein, will become more apparent with the disclosure of the preferred embodiments in the specification, claims and drawings, in which:

DESCRIPTION OF THE DRAWINGS

FIG. 1 is a somewhat schematic elevational view of a mechanism for making profile film constructed and operating in accordance with the principles of the present invention;

FIG. 2 is a vertical sectional view taken through a film strip with profiles illustrating the type of construction formed in accordance with the invention;

FIG. 3 is a vertical sectional view taken through the top of a bag formed from the film of FIG. 2;

FIG. 4 is a somewhat schematic enlarged fragmentary sectional view showing a portion of the cooling mechanism;

FIG. 5 is a fragmentary enlarged side elevational view of another form of the cooling mechanism;

FIG. 6 is a fragmentary detailed view of a further form of the invention; and

FIG. 7 is another fragmentary schematic view of a further form of the invention.

DESCRIPTION

FIG. 1 illustrates a mechanism for attaching a profile to a traveling strip of film. The structure is somewhat similar in principle to the mechanism shown in the copending application, Ser. No. 178,086 but other variations may be employed. In accordance with the type of mechanism generally illustrated, a flat thin strip of film is delivered traveling along a path and a freshly extruded profile is positioned on the film to be bonded thereto by the heated plastic of the profile adhering to and solidifying with the film.

In FIG. 1 a strip of thin plastic film such as a laminate with one polyethylene surface travels over a guide roll 10 and successive rolls 11, 12 and 13 to pass upwardly in the nip between a pair of press rolls 14 and 15. The press roll 15 has a recess so as to admit a freshly extruded heated plastic profile P. The profile emerges from the die opening of an extruding head 16 which is supplied with heated plastic from an extruder 17. The die 16 and extruder 17 may be of various conventional designs which will be fully recognized by those versed in the art.

The film sheet F is preferably heated such as by passing over the heated roll 14 so that the profile will more readily adhere to the surface and form a firm bond. The plastic of the profile P being freshly extruded is relatively hot and must be cooled so that it will solidify for subsequent interlocking or for rolling up the profile film on a roll in a continuous operation. For this purpose a coolant jet mechanism 24 is provided directing a flow of coolant against the heated profile to remove heat therefrom. The film sheet is guided upwardly over a series of guide rolls 19, 20, 21 and 22.

The coolant jet 24 may be referred to as a control coolant jet because it has been discovered that this jet can control the shape of the resultant profile on the film. The profile after being adhered to the film, is in the somewhat plastic formative stage, and it has been found that the coolant jet 24 can influence the shape of the profile by controlling the location where the coolant fluid is directed and the direction at which it engages the profile as well as the pressure or velocity at which it engages the profile. The coolant employed is preferably air, but other gases or water may be used.

An additional cooling means 23 further along the path of travel of the strip may be employed for completing the cooling operation. The primary or the control coolant jet 24 removes the majority of heat and controls the shape of the profile, and the secondary coolant means 23 completes the operation, but usually has no effect on the size and shape of the profile. Also, to increase the cooling operation, a cooling means 23a may be placed in opposing relationship to the cooling means 23.

The extruder head 16 may be designed to extrude one or more profiles and, for example, a rib profile and a groove profile may be simultaneously extruded. The profiles must be accurately sized and shaped to be able to interlock when pressed together and to hold together with maximum strength. To accomplish this with the smallest profile possible and to thereby save the amount of plastic required and to be able to do so at as high a speed as possible, preciseness and accuracy in the shape of the profile is mandatory. In accordance with the present invention, it has been discovered that this shape can be controlled by controlling the direction and/or pressure of coolant directed against the profile after it has been placed on the sheet.

A sheet of the type formed with the mechanism illustrated is shown in FIG. 2 wherein the plastic film 26 has profiles 27 and 28 bonded to the surface. A use for this type of film is shown in the structure of FIG. 3 wherein the film sheet is doubled to form a doubled closed bag with a top 30 and a bag interior 29 and a bottom 30b. The top of the bag has interlocking profiles 27 and 28. For use the bag will be slit along the top 30, and the profiles can be pulled apart by the flanges located above them for access to the interior of the bag. For reclosing the bag the profiles 27 and 28 will be pressed together by applying a lateral pressure along the top of the bag on either side of the profiles.

A typical set of profiles will consist of a general arrowhead shape for one profile as shown schematically at 27 in FIG. 2, and a complementary groove shape with overlapping side jaws for the other profile as shown schematically at 28 in FIG. 2.

FIG. 4 illustrates the relationship between the profile P on the film F and the cooling head 24. The cooling head is shown as having one or more jets illustrated by the air jets 33 and 34. Air supply lines 36 and 37 are connected to the jets. The jets are mounted on a movable adjustment piece 35 so that their angle can be altered in a direction transversely of the direction of travel of the profile. By shifting the jets in an arcuate path through 180° relative to the profile, more or less heat will be removed from one side of the profile than the other in the initial cooling which will change the shape of the resultant profile. During operation, the position of these jets can be changed to obtain the optimum shape in the profile. Thus this shape may be changed to correct, for example, unequal size jaws in the female profile. This feature may be also used to correct resultant unequal size barbs of the male profile due to inaccuracies in the shape of the die 16. Additionally, if at different speeds of extrusion, the plastic tends to flow so that the head or jaw of the male or female profile is smaller on one side than on the other side, then compensation can be made by adjusting the position of the air jets.

FIg. 5 shows an arrangement wherein a coolant jet 38 is adjustable through 180° so that the jet can be directed from a position facing the oncoming moving profile P to a position where its direction is parallel with the movement of the profile. This arrangement tends to control the profile height and its general shape. The adjustment arrangement wherein the coolant jet direction is adjusted in the direction of movement of the profile or normal to the direction of movement of the profile may be combined or may be used individually.

FIG. 6 shows an arrangement wherein a plurality of individual jets 40, 41, 42 and 43 are used such as with a female profile F. These jets will be individually adjustable and also adjustable as a block in both of the directions illustrated in FIGS. 4 and 5 so as to be able to vary the direction and position of engagement of the coolant with the moving profile. Adjustment means are shown at 48, 49, 50, 51 and 52.

A further variation may be introduced in control of the pressure of the flow of coolant. As shown in FIG. 7, a traveling profile has a jet 45 directed thereagainst supplied with a flow of coolant through a line 46 controlled by a pressure control valve 47. By varying the valve 47, the rate of flow of the coolant through the jet 45 is altered which will have an effect on the resultant shape of the profile P. The pressure control arrangement of FIG. 7 may be employed alone or simultaneously with the arrangement shown in FIGS. 4 through 6.

An additional variation may also be introduced by controlling the temperature of the coolant by passing it through a heat transfer mechanism 53 wherein the coolant can be brought to and maintained at a predetermined optimum temperature for satisfactorily cooling the profiles.

I claim as my invention:

1. In the method of making plastic film with shaped profiles on the surface comprising the steps of:
    extruding a continuous length of an interlocking profile from a die opening with the profile having a precise shape for interlockingly engaging with another profile;
    and directing a flow of coolant onto the extruded profile of warm plastic and adjusting the direction of flow of coolant relative to the direction of movement of the profile for controlling the cooling rate and shape of the profile.

2. In the method of making a plastic film with shaped profiles on the surface in accordance with claim 1.
    wherein said direction is adjusted through an arc of 180°.

3. In the method of making plastic film with shaped profiles on the surface in accordance with the steps of claim 1.
    wherein the flow of coolant is adjusted in an arc extending in the direction of travel of the profile length.

4. In the method of making plastic film with shaped profiles on the surface in accordance with the steps of claim 1.
    wherein the flow of coolant is adjusted in an arc extending transversely of the direction of movement of the profile length.

5. In the method of making plastic film with shaped profiles on the surface comprising the steps of:
    extruding a continuous length of an interlocking profile from a die opening with the profile having a precise shape for interlockingly engaging with another profile;

and directing a flow of coolant against the heated profile and adjusting the pressure of coolant flow for controlling the cooling rate and shape of the profile.

6. In the method of making plastic film with shapes profiles on the surface, the steps of:

extruding a continuous length of an interlocking profile from a die opening with the profile having a precise shape for interlockingly engaging with another profile;

directing a flow of coolant onto the extruded profile of warm plastic;

and varying the temperature of the coolant flow for controlling the cooling rate and shape of the profile.

7. In the method of making plastic film with shaped profiles on the surface, the steps of:

extruding a continuous length of an interlocking profile from a die opening with the profile having a precise shape for interlockingly engaging with another profile;

directing a first flow of coolant against the heated profile length in a small jet shape;

and directing a second flow of coolant in a small jet shape against the heated profile length;

said first flow being directed laterally relative to the axis of the profile and said second flow being directed in a direction laterally opposing the first flow of coolant.

8. In the method of making plastic film with shaped profiles on the surface, the steps of:

extruding a continuous length of an interlocking profile from a die opening with the profile having a precise shape for interlockingly engaging with another profile;

directing a first flow of coolant in a small jet shape against the heated profile length;

and directing a second flow of coolant in a small jet shape against the heated profile length;

said second flor of coolant being positioned after the first flow of coolant in the direction of profile lenth movement.

* * * * *

REEXAMINATION CERTIFICATE (675th)
United States Patent [19]
Noguchi

[11] B1 3,945,872
[45] Certificate Issued May 5, 1987

[54] MAKING PLASTIC FILM WITH PROFILES AND OPENING MEANS FOR BAGS

[75] Inventor: Takashi Noguchi, Tokyo, Japan

[73] Assignee: Minigrip Inc., Orangeburg, N.Y.

Reexamination Request:
No. 90/000,996, Apr. 25, 1986

Reexamination Certificate for:
Patent No.: 3,945,872
Issued: Mar. 23, 1976
Appl. No.: 428,433
Filed: Dec. 26, 1973

Related U.S. Application Data

[63] Continuation-in-part of Ser. No. 178,086, Sep. 7, 1971, Pat. No. 3,787,269.

[51] Int. Cl.⁴ .................... B29C 47/90; B32B 31/24
[52] U.S. Cl. ........ 156/244.24; 156/244.15; 156/244.25; 156/498; 156/500
[58] Field of Search ............... 156/66, 91, 244.11, 156/244.24, 497, 498, 500, 244.15, 244.25; 264/176 R; 24/572

[56] References Cited

U.S. PATENT DOCUMENTS

| | | | |
|---|---|---|---|
| Re. 26,991 | 7/1964 | Luca | 264/95 |
| 855,438 | 5/1907 | Ebel | |
| 2,423,237 | 7/1947 | Heslecher | 156/285 |
| 3,075,868 | 9/1957 | Long | 156/82 |
| 3,283,367 | 6/1961 | Mueller | 93/35 |
| 3,322,594 | 5/1967 | Lucas et al. | 156/308 |
| 3,421,960 | 1/1969 | Arbit | 156/244 |
| 3,462,332 | 8/1969 | Goto | 156/244 |
| 3,543,379 | 12/1970 | Naito | 29/400 |
| 3,694,538 | 9/1972 | Okamoto | 264/173 |
| 3,875,281 | 4/1975 | Behr | 264/95 |
| 3,932,090 | 1/1976 | Brumlik | 425/381 |

*Primary Examiner*—Caleb Weston

[57] ABSTRACT

A method and mechanism for continuously making a plastic film with shaped profiles on the surface including extruding a continuous length of interlocking profiles from a die shaped with a precise shape for interlockingly engaging with another profile and directing a flow of coolant on the profile from a stationary coolant means and adjusting the direction of flow of coolant relative to the direction of movement of the profile or controlling the pressure and temperature of the flow of coolant to control the cooling rate and the shape of the profile.

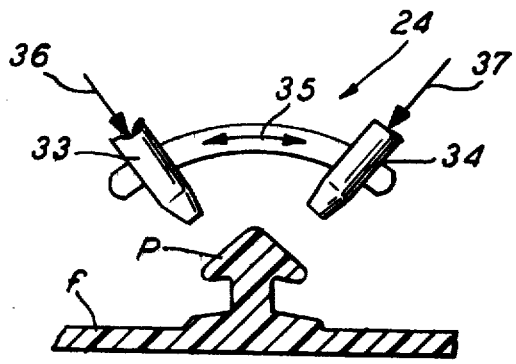

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 and 7 is confirmed.

Claims 6 and 8 are determined to be patentable as amended.

6. In the method of making plastic film with shaped profiles on the surface, the steps of:
   extruding a continuous length of an interlocking profile from a die opening with the profile having a precise shape for interlockingly engaging with another profile;
   directing a flow of coolant onto the extruded profile of warm plastic *in a predetermined variable direction while the plastic is in the formative stage;*
   and varying the temperature of the coolant flow for controlling the cooling rate and shape of the profile.

8. In the method of making plastic with shaped profiles on the surface, the steps of:
   extruding a continuous length of an interlocking profile from a die opening with the profile having a precise shape for interlockingly engaging with another profile
   directing a first flow of coolant in a small jet shape against the heated profile length *in a predetermined variable direction while the plastic is in the informative state;*
   and directing a second flow of coolant in a small jet shape against the heated profile length;
   said second [flor] *flow* of coolant being positioned after the first flow of coolant in the direction of profile [lenth] *length* movement.

* * * * *